United States Patent [19]

Maloney

[11] 4,290,416

[45] Sep. 22, 1981

[54] PHASE CHANGE ENERGY STORAGE PANEL FOR ENVIRONMENTALLY DRIVEN HEATING AND COOLING SYSTEM

[75] Inventor: Timothy Maloney, Winchester, Va.

[73] Assignee: One Design, Inc., Winchester, Va.

[21] Appl. No.: 942,132

[22] Filed: Sep. 13, 1978

[51] Int. Cl.³ .............................................. F24J 3/02
[52] U.S. Cl. .................................... 126/430; 126/428; 126/400; 126/431; 165/48 S; 165/DIG. 4; 165/104.15; 52/173 R
[58] Field of Search ............... 126/428, 430, 429, 436, 126/444, 445, 446, 449, 450, 400, 165, 431; 165/48 S, 104 S, DIG. 4; 16/DIG. 13; 52/173 R

[56] References Cited

U.S. PATENT DOCUMENTS

| | | | |
|---|---|---|---|
| 1,742,861 | 1/1930 | Johnson | 237/59 |
| 2,515,298 | 7/1950 | Feldman | 126/400 X |
| 2,595,905 | 5/1952 | Telkes | 126/428 |
| 2,857,634 | 10/1958 | Garbade et al. | 126/419 |
| 3,107,052 | 10/1963 | Garrison | 126/419 |
| 3,463,161 | 8/1969 | Andrassy | 126/400 X |
| 3,720,198 | 3/1973 | Laing et al. | 126/400 |
| 3,729,879 | 5/1973 | Franklin | 52/173 |
| 3,842,463 | 10/1974 | Wehner | 16/DIG. 13 X |
| 3,897,820 | 8/1975 | Teeter, Jr. | 126/428 |
| 3,960,205 | 6/1976 | Laing | 52/173 R X |
| 4,050,443 | 9/1977 | Peck et al. | 126/429 |
| 4,124,018 | 11/1978 | Murray et al. | 126/400 |
| 4,131,971 | 1/1979 | Saarloos | 16/DIG. 13 X |
| 4,162,671 | 7/1979 | Christy | 126/400 |
| 4,162,671 | 7/1979 | Christy | 126/400 |
| 4,178,727 | 12/1979 | Prusinski et al. | 126/430 X |
| 4,212,289 | 7/1980 | Hebert | 126/430 |
| 4,212,292 | 7/1980 | Reinert | 126/429 X |
| 4,213,448 | 7/1980 | Hebert | 126/400 X |

*Primary Examiner*—Larry Jones
*Attorney, Agent, or Firm*—Cushman, Darby & Cushman

[57] ABSTRACT

A container of phase change energy storage material such as Glauber's salt is deployed behind the glazing of the south wall of a building structure for absorbing heat to heat the structure and/or for radiating heat to cool the structure. Several construction modules and mounting arrangements are shown, including ones where panels are backed with thermal insulation and pivotally mounted for reversibility.

22 Claims, 7 Drawing Figures

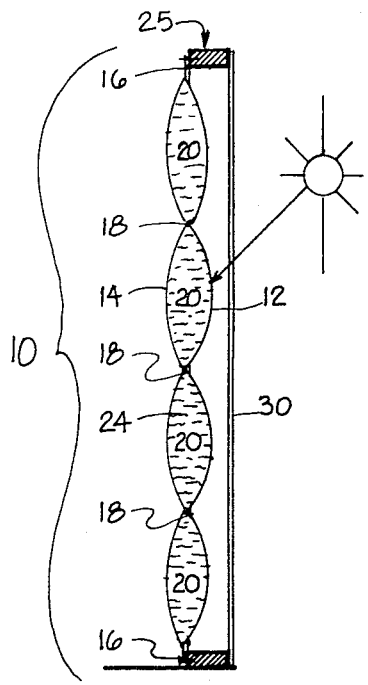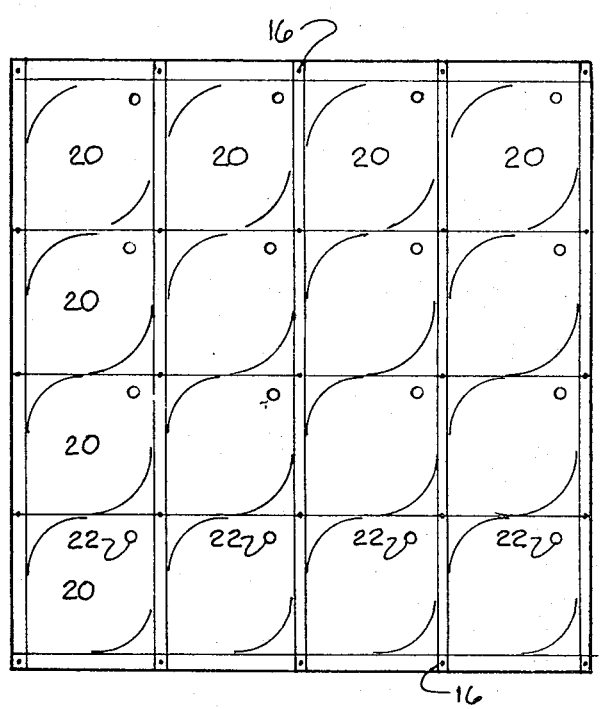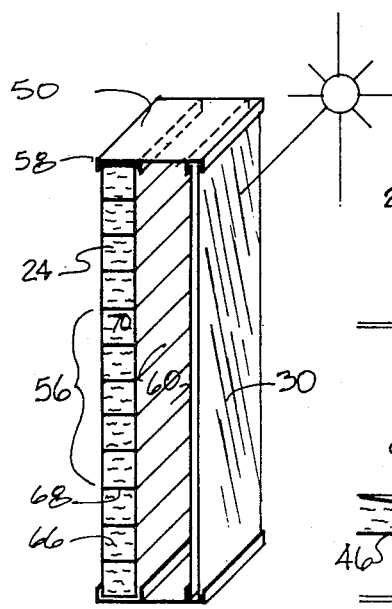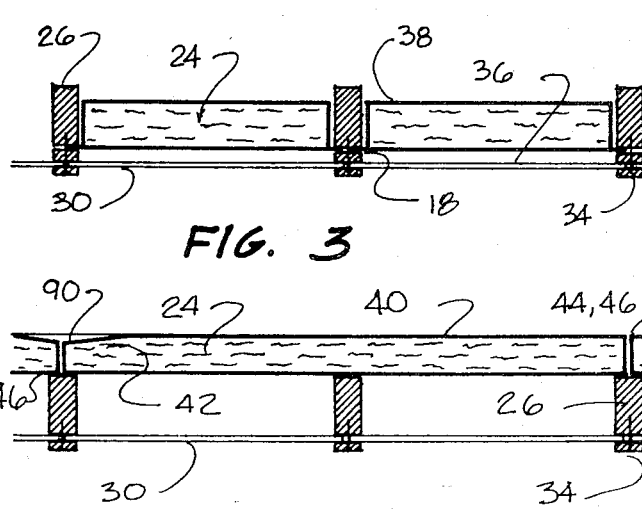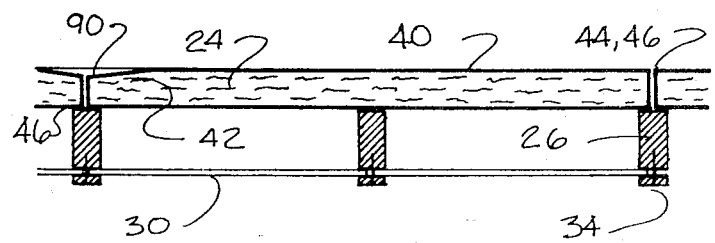
FIG. 2　　FIG. 1
FIG. 5　　FIG. 4　　FIG. 3

PHASE CHANGE ENERGY STORAGE PANEL FOR ENVIRONMENTALLY DRIVEN HEATING AND COOLING SYSTEM

BACKGROUND OF THE INVENTION

Recently, there have been published a number of books which survey the present state of the art of solar heating and cooling of buildings. Noteworthy are:

The Solar Home Book, heating, cooling and designing with the sun, Bruce Anderson with Michael Riordan, Cheshire Books, Hanesville, New Hampshire (1976); and Designing and Building a Solar House, Your Place in the Sun, Donald Watson, Garden Way Publishing, Charlotte, Vermont (1977).

Particularly of interest in the Anderson book are the following topics:

M.I.T. Solar House II (1947), pp. 23, 24; Telkes, et al—Dover House (1948), pp. 24, 25; Jonathan Hammond—Winters House (1974), pp. 40-42, 181, Chapter 4—Direct Solar Heating, pp. 76-113; Wright House (1974), pp. 108, 109; Odillo House 1962 (1962), p. 129; Zomeworks-Baer House (1971-1972), pp. 129-133, 181; Kalwall Corp. "Sun-Lite" storage wall collectors, pp. 133, 240, 241; Harold Hay/Sky Therm Process and Engineering—Solar Architecture House (1973), pp. 133, 137, Phoenix Test Building (1967), pp. 135-137, Sky Therm North, p. 140; Total Environmental Action-Jackson Freese House, p. 140; Day Chahroudi—Subfloor Heat Storage, p.142; Small Containers of Water, p. 188, 189; Solar Cooling, p. 197, 198; Bill and Susan Yanda—Solar Sustenance, pp. 233-239; Jonathan Hammond—Hammond House (1975), pp. 239-241.

Particularly of interest in the Watson book are the following topics:

M.I.T. Solar House II (1947), pp. 6, 7; Telkes et al—Dover House (1948), pp. 6, 7; Wright House (1974), p. 29; Zomeworks—Baer House (1971-1972), pp. 35, 45; Kalwall Corp. "Sun-Lite" storage wall collectors, p. 38; Harold Hay/Sky Therm Process and Engineering-Solar Architecture House (1973), pp. 31, 38-40, 47-49; Other Window Collector Designs, p. 30; Bill Mingenbach, p. 38; Prof. Shawn Buckley/M.I.T.—Thermic Diode Solar Building Panels, pp. 41, 42; J. D. Balcomb and J. C. Hedstrom—Simulation Analysis of Passive Solar Heated Buildings, Los Alamos Scientific Laboratory, p. 48; Selecting a Solar Heating Approach, pp. 172-174.

Also, in the Watson book, particularly see pp. 76, 77 for a discussion of phase change energy storage medium.

Both books contain extensive bibliographies and appendices of interest.

At approximately the same time, I am filing three other U.S. patent applications on related topics, respectively identified as follows:

| Title | Serial No. | Filing Date |
| --- | --- | --- |
| Environmentally Driven Heating and Cooling System | 941,735 | September 12, 1978 |
| Thermosiphoning Module for Environmentally Driven Heating and Cooling System | 942,133 | September 13, 1978 |
| High Mass Wall Module for Environmentally Driven Heating and Cooling System | 942,131 | September 13, 1978 |

SUMMARY OF THE INVENTION

A container of phase change energy storage material such as Glauber's salt is deployed behind the glazing of the south wall of a building structure for absorbing heat to heat the structure and/or for radiating heat to cool the structure. Several construction modules and mounting arrangments are shown, including ones where panels are backed with thermal insulation and pivotally mounted for reversibility.

It is an object of the invention to considerably improve the usefulness of Glauber's salt as an economical phase change energy storage medium by providing convenient containers of that medium, which, by having a relatively thin cross section, enhance the useful life of the medium by decreasing the extent to which the medium becomes permanently stratified in use.

What is contemplated are panel units which are facially large compared to their thickness, and which have but a thin section of contained hydrated salt medium. Although some principles of the invention certainly can be put to work in installations having conventionally—thick sections of phase change energy storage medium (for instance 4 centimeters thick), much of the cell architecture was developed with thin sections, in the range of about ½ to about 1½ centimeters thick in mind.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 1 is a front elevational view of a collector panel constructed in accordance with principles of the present invention;

FIG. 2 is a vertical sectional view of the collector panel of FIG. 1, mounted in a building structure;

FIG. 3 is a horizontal sectional view of a first modification of what is shown in FIG. 2;

FIG. 4 is a horizontal sectional view of a second modification of what is shown in FIG. 2;

FIG. 5 is a cut-away isometric view of a third modification;

DETAILED DESCRIPTION OF THE PRESENTLY PREFERRED EMBODIMENTS

Figure 6:
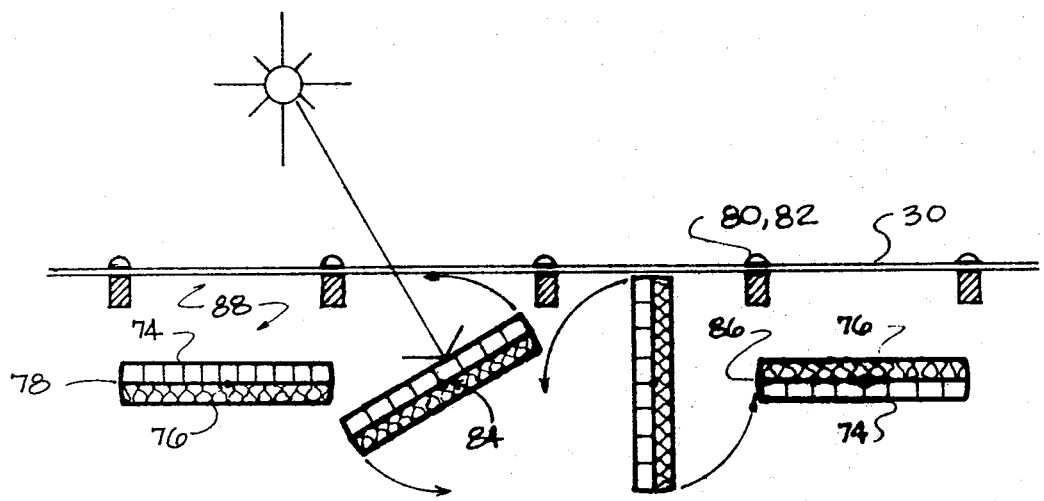
FIGS. 6 and 7 are diagrammatic top plan views respectively illustrating two related ways of mounting the panels so they may be moved between two stations of use.

Referring to FIGS. 1 and 2, the collector panel 10 is constituted by two confronting sheets 12, 14 of flexible synthetic plastic resin film, which are quilted together marginally at 16, and also intermediately at 18, to divide the space between the sheets and their joined borders into a two-dimensional array of individual, perimetrically sealed hollow cells 20.

The films 12, 14 may be of the same plastic material, or of two different materials, including ones made of one layer, or of several that are clad, laminated, coextruded or the like. Likewise the seams 16, 18 may be made any way that will make them assuredly watertight for the particular sort(s) of material being seamed. For instance, ultrasonically fused, heat fused, pressed, stitched, adhered, cohered, crimped or welded seams could be made. For sheet material there may be used, for example, the same kinds and thicknesses of plastic sheets as are conventionally used in the manufacture of air mattresses, water beds, beach balls, piping for domestic plumbing, food wrapping, garden mulching and the like. Polyvinylchloride is but one among the many kinds of plastic film which may be used. Indeed, other materials such as glass and/or sheet metal can be used as the sheets 12, 14.

By preference, the cells are spaced along the collector in a rectangular grid pattern or the like, as shown in FIG. 1, which repeats on the same frequency as the usual spacing between building wall studs. Then, the collector stock 10 may be furnished in large sheets or rolls, to be cut when purchased, or on the job site to fit the needed width, and height for installation.

There are many ways the pouch-like cells 20 could be filled with respective quantums of phase-change energy storage medium. One way I presently prefer is to provide one of the sheets of plastic film with a pre-inserted array of filler valves 22, one for each eventual cell. The valves 22 may be of the very sort as are used for filling beach balls, air mattresses and other similar inflated products such as the others mentioned above. (During a development of the invention, some continuing accessibility to the cell contents following installation is seen as a desirable characteristic.)

Another way the cells may be filled is by providing a self-healing septum as the member 22, whereupon filling may be done by hollow needle, e.g. a "hypodermic" needle. There are other ways; for instance, the pouches may be filled simultaneously with their creation, using the form-fill-seal processes, apparatus and sheet material of the retortable pouch food industry.

Typically, as phase change energy storage medium 24, Glauber's salt is used, although the latent heat capacity of any material that melts and freezes in temperature range of the collector in use, and which is readily available may be used. A typically useful material for a phase change energy storage medium is a salt hydrate having a melting point in the range between 24° C. and 48° C. The Watson text, referred to in the above "Background" section, provides the following examples, citing Maria Telkes as source: $CaCl_2.6H_2O$, $Na_2CO_3.10H_2O$, $Na_2HPO_4.12H_2O$, $Na_2SO_4.10H_2O$ and $Na_2S_2O_3.5H_2O$. Any of these, and others, may be used when practicing the present invention.

Referring to FIG. 2, a filled, properly sized collector 10 is mounted to a building structure 25. As shown, the building structure 25 incorporates the studs 26 and plates 28 of framing. The collector 10 is shown secured in place by nailing, stapling or similarly perimetrically securing the seam region 16 to the framing. For long and/or tall collectors, some intermediate framing elements and securement of the intermediate seam regions 18 may be needed to prevent sagging and/or to provide adequate dispersal of force concentrations from support points.

As depicted in FIG. 2, the films 12 and 14 are of similar weight and flexibility, so that, when filled, each distends approximately equally to assume a plump pillow shape. However, that is not a prerequisite for practicing the invention; both sides may be relatively flat, or one side may be bulged and the other relatively flat, depending on the sheet material, whether the sheet material on either side is preformed prior to seaming, and the shape and sort of seams made.

A layer of glazing 30 is shown completing the building structure. Although it is shown, diagramatically, juxtaposed with the framing, and ranked outside the body of solar collector cells. In such an instance, securement of the glazing to the framing may be accomplished by caulking, and/or with the use of suitable mullions and/or auxillary framing (not shown).

In practice, sunlight streaming through the glazing impinges upon the arrayed quantums of frozen phase change heat storage medium, much heat may be absorbed as heat of fusion without increasing the temperature of the medium. Eventually, if sufficient heat is absorbed, the quantums undergo phase change, melting to a liquid and beginning to rise in temperature, if further heated. With the setting of the sun, the process begins to yield heat to the structure, and returns to a solid if sufficient heat is lost. The extent to which heat lost by the quantums of medium is gained by the structure can be enhanced by any and all of the techniques set forth in my aforementioned copending application Ser. No. 941,735 filed Sept. 12, 1978. For instance, at night, an insulating curtain (not shown here) may be drawn between the quantums and the glazing to avoid much heat loss toward the outdoors.

Two points already introduced, are developed further with respect to FIGS. 3 and 4.

In FIG. 1 the array of pouches is $4 \times 4$, as shown; in FIG. 2, it is four high, by an indeterminate number wide; in FIG. 3, it is an indeterminate number high, by two wide. In the construction shown in FIG. 3, the housing structure includes a stud 26 intermediate the two columns of cells, with an intermediate vertical seam 18 overlying and being nailed to the middle stud 26, with the use of stressdistributing battens 32. The glazing 30 is installed with the aid of mullions 34.

In the FIG. 2 construction, as noted hereinbefore, the plastic sheets 12 and 14 are equally bulged in opposite directions for a pillow effect. In the FIG. 3 construction, substantially all of the thickness of the cells is carried within the thickness of the framing 25, because the sheet 12 is generally flat and not bulged, the sheet 14 is greatly bulged, as if it were the bottom half of an airline single service grape-jelly container, and the seam regions are secured on the outer sides of the studs.

There is thus provided an insulating space 36 between the panel 10, the glazing 30 and the battens 32.

The inner side of the wall 38 may be left as shown, with the framing and cells visible from within the structure, or any architectural masking may be provided, so long as it only minimally reduces the efficiency of the system.

In the construction shown in FIG. 4, like parts have been given like numerals. Notice, though, that the panel 40 is of a different superficial shape. In fact, it is shaped exactly like a sheet of conventional gypsum wall board, excepting that the usual paper covering is replaced by a waterproof sac, envelope or the like, providing a single cell 20 per panel, and that the gypsum compound is replaced by phase change energy storage medium 24. Notice particularly that the individual sheets are beveled at 42 perimetrically of the inner face 14. If desired, tubular grommets 44 may be installed in a liquid-tight manner intermediate sites which will overlie intermediate studs 26. Then, the sheet-like panels 40 may be put up just like wall board, e.g. with nails, clips 46 between panels, paneling adhesive 48 between a panel and stud 26, and/or nails 46 through tubular grommets 44. With the right combination of nails and plastic sheeting 12, 14, it may be possible to nail directly through the cell 40 and simultaneously squeezably seal the two sheets 12, 14 together around the nail so that there will be no leakage of cell contents when they are molten during use.

After installation, the joints and fastener depressions facing "indoors" are taped and/or spackled, as illustrated at 90 in FIG. 4 and the resulting flat surface may be painted just as if it were wall board.

A considerably integrated structure is shown in FIG. 5. There, the same mullions 50 which support the glazing 30 between opposed channels 54 also hold the collector panel 56 ranked therebehind, between opposed channels 58. As with the other embodiments, an insulating space 60 is provided between the glazing 30 and the collector panel 56. Although a laterally intermediate section of the structure is shown in FIG. 5, the left and right ends may be supported in similar mullions (not shown).

The glazing need not be glass; it may be, e.g. of a transparent plastic material used as glazing. Whether of glass or plastic, the glazing need not be one layer thick, but may alternatively be of bilayer form, including between the layers a dead air space.

The form of the "exoskeleton" 62 of the panel 56 preferably is somewhat different from the ones described with respect to FIGS. 1-4. It is shown being a more rigid, yet transparent structure that includes a generally flat outer face 64, generally flat inner face 66 spaced therebehind, and a plurality of generally horizontal transversally extending webs 68 at regularly spaced levels of the height of the panel 56. Seen in end elevation, the preferred transverse cross-sectional figure of the exoskeleton 62 is that of a ladder (with side rails 64, 66 and rungs 68). The structure 62 may be, e.g. an extrusion of a transparent, relatively rigid polymerized synthetic plastic material such as polysyrene or polycarbonate. There is presently commercially available a product which appears to be suitable for use as the structure 62. The material in question is presently sold as doubld glazing for greenhouses under the tradename Acralite by Cyro Industria and under the tradename Tuffak Twinwall by Rohm & Haas.

The webs 68 divide the space between the faces 64 and 66 into a two-dimensional series of vertically adjoining, horizontally extending individual cells 70. Each is filled with a quantum of phase change energy storage medium while open at at least one end. The cells are then sealed at the ends by a technique suitable to the structure, e.g. installation of a fitting which is sealed in place, solvent welding, heat and/or pressure, caulking, or the like.

Although the Figures preferably show a south wall installation for an outside wall of the building structure, as described further in my aforementioned copending application Ser. No. 941,735, filed Sept. 12, 1978, the installation may be made relative to an internal wall or north-facing external wall that is sunlighted via a skylight, or as a horizontal, e.g. ceiling or floor related structure, sunlit via a south facing window and/or via a skylight.

Figure 7:
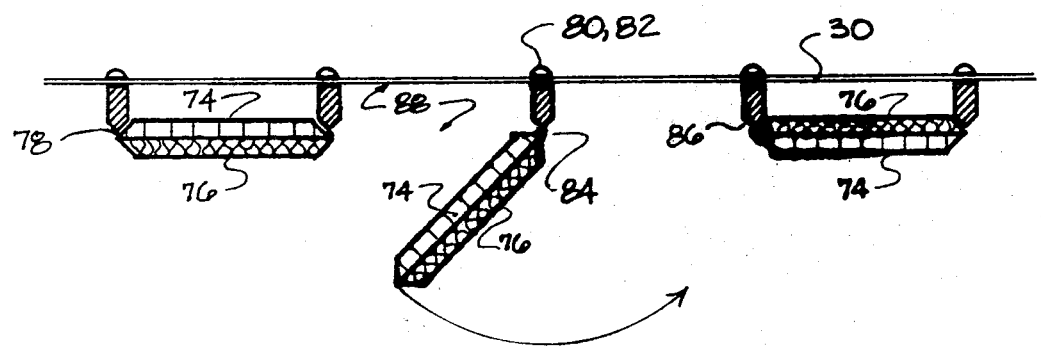

FIGS. 6 and 7 depict installations wherein each panel 74, e.g. constructed as described above with relation to any of FIGS. 1-5, is facially mounted back-to-back with a layer, e.g. a board of thermal insulation material 76, e.g. a layer of polystyrene foam from a fraction of a centimeter to several centimeters thick. Where the resulting composite structure 78 would need it to be self-supporting, framing or some other support may be incorporated with the thermal insulation-backed collector panel 78.

Items 80, 82 are mullions and framing. Although the thermal insulation-backed collector panels 78 can be used by ones, it is contemplated that, often, several will be arranged edge to edge, ranked behind a glazed facade, e.g. a glazed south-facing wall, likewise formed of a series of glazing panels mounted edge-to-edge in the mullions 80.

In the FIGS. 6 and 7 instances, the thermal insulation-backed collector panels 78 each are pivotally mounted at 84 for being rotated between a first position in which the cells of phase change energy storage medium quanta face the glazing, the outdoors and the sun, and the panel of thermal insulation material 76 faces the enclosed space of the structure, i.e. the "indoors", and a second position, after rotation through 180 degrees, in which the dispositions of elements 74 and 76 are exchanged.

In the FIG. 6 instance, the respective vertical axis pivots 84 pass through the respective backed panels intermediate the width of each so that each backed panel 78 rotates progressively from the first position, shown at the left in FIG. 6, via the intermediate stages shown in the next two instances toward the right in FIG. 6, to the second position, shown at the right in FIG. 6. The pivots 84 may be journalled in the building structure ceiling and/or floor, and/or in framing, stanchions or the like (none shown) provided for that purpose.

The embodiment shown in FIG. 7 is very similar, except that the pivots 84 are at respective one ends of the backed panels and may, therefore, be constituted by polypropylene integral hinges which also provide a seal along the length thereof. Again, the progression of movement from the first position to the second position of the backed panels is shown from left to right in the Figure.

In both instances, the backed panels are provided with perimetrical seals 86, e.g. such as are used on and between refrigerator chests and doors (e.g. of the bellows and strip magnet type). These ensure that when the backed panels are in either the first position or the second position, the space 88 between the backed panels and the glazing is relatively air tight to protect against unwanted convection to and from the space 88 and "indoors".

It should be clear that when the backed panels 78 are in their first position, the cells are available to be impinged upon by sunlight and heated, while the insulation layer prevents overheating of the interior of the structure. When the backed panels 78 are reversed to their second position, the heat stored by the phase change energy storage medium is released to "indoors" while the insulation 76 prevents heat loss to outdoors.

While all-manual, individual operation of switching of the panels between their first and second positions is possible, various string and pulley arrangements, with or without motor operation, may be provided, as suggested at 92 for ganged, or at least conveniently remote switching of the backed panels between their first and second positions.

In the FIG. 7 construction, insulating shade screens or the like (not shown) may be alternately used at either end of the array to accommodate the leftward and rightward migration of the whole backed panel system relative to the glazing as the backed panels are switched.

For cooling, the operation is reversed, so that heat is absorbed from indoors during the day, while the insulation protects against intrusion of heat from outdoors. Then, in the cool of the night, the backed panels are reversed, so that the cells lose their collected heat to the dark sky.

It should now be apparent that the phase change energy storage panel for environmentally driven heating and cooling system as described hereinabove, possesses each of the attributes set forth in the specification under the heading "Summary of the Invention" hereinbefore. Because it can be modified to some extent without department from the principles thereof as they have been outlined and explained in this specification, the present invention should be understood as encompassing all such modifications as are within the spirit and scope of the following claims.

What is claimed is:

1. A phase change energy storage panel, comprising:
at least one quantum of phase change energy storage medium capable of gaining and losing heat of fusion in a temperature within a temperature range to which the panel is to be subjected during use; said quantum being of sufficiently thin transverse cross section as to avoid permanent stratification of said quantum throughout substantially the full thickness thereof during such use;
a cell having wall means including an outer face and an inner face and enveloping each such quantum, said cell wall means including portions constructed and arranged to be engaged for supporting the panel for the panel to be impinged upon by sunlight;
said cell wall means portions extending perimetrically of said at least one quantum;
said cell wall means being constituted by two confronting sheets of liquid-tight material; said sheets being perimetrically seamed together in a liquid-tight manner to provide at least one enclosed space;
said sheets also being intermedially seamed together in a liquid-tight manner according to a pattern which is bordered by their aforesaid perimetrical seaming;
said seaming also including portions constructed and arranged to be engaged for supporting the panel for the panel to be impinged upon by sunlight;
said cell wall means portions are free of direct communication with each said quantum, so that fasteners may be secured therethrough for supporting the panel without permitting leakage of molten phase change energy storage medium from said panel;
framing means for supporting the panel; and
fasteners securing the panel at said portions to said framing means;
the framing means are constituted by housing structure framing including studs; and
said cell extending widthwise from one said stud to an adjacent next one of said studs.

2. The phase change energy storage panel of claim 1, further including:
a panel of glazing ranked relatively outside said cell wall means, in a confronting manner, with a space therebetween; and
wall means perimetrically substantially enclosing the last-mentioned space, to provide an air chamber between the at least one cell-enveloped quantum of phase change energy storage medium and the panel of glazing.

3. The phase change energy storage panel of claim 1, wherein:
said pattern of intermedial seaming extends to said perimetrical seaming thereby dividing said enclosed at least one space into a plurality of individual cells in a two-dimensional array;
there being a said quantum in each such cell.

4. The phase change energy storage panel of claim 3, wherein:
said two-dimensional array is a plurality of cells in height.

5. The phase change energy storage panel of claim 3, wherein:
said two-dimensional array is a plurality of cells in width.

6. A phase change energy storage panel, comprising:
at least one quantum of phase change energy storage medium capable of gaining and losing heat of fusion in a temperature within a temperature range to which the panel is to be subjected during use; said quantum being of sufficiently thin transverse cross section as to avoid permanent stratification of said quantum throughout substantially the full thickness thereof during such use;
a cell having wall means including an outer face and an inner face and enveloping each said quantum, said cell wall means including portions constructed and arranged to be engaged for supporting the panel for the panel to be impinged upon by sunlight;
said cell wall means portions extending perimetrically of said at least one quantum;
said cell wall means being constituted by two confronting sheets of liquid-tight material; said sheets being perimetrically seamed together in a liquid-tight manner to provide at least one enclosed space;
said sheets also being intermedially seamed together in a liquid-tight manner according to a pattern which is bordered by their aforesaid perimetrical seaming;
said quantum and cell wall means being shaped and associated comparably, respectively, to the gypsum filing and covering sheet material of conventional gypsum board dry wall paneling, including tape joint trough means extending along two opposed edges thereof on one face thereof, so that said phase change energy storage panel may be hung, taped and spackled much like conventional dry wall paneling.

7. A phase change energy storage panel, comprising:
at least one quantum of phase change energy storage medium capable of gaining and losing heat of fusion in a temperature within a temperature range to which the panel is to be subjected during use; said quantum being of sufficiently thin transverse cross section as to avoid permanent stratification of said quantum throughout substantially the full thickness thereof during such use;
a cell having wall means including an outer face and an inner face and enveloping such said quantum, said cell wall means including portions constructed and arranged to be engaged for supporting the panel for the panel to be impinged upon by sunlight;

said cell wall means portions extending perimetrically of said at least one quantum;

said cell wall means being constituted by two confronting sheets of liquid-tight material; said sheets being perimetrically seamed together in a liquid-tight manner to provide at least one enclosed space;

said sheets also being intermedially seamed together in a liquid-tight manner according to a pattern which extends to and is bordered by their aforesaid perimetrical seaming, whereby said enclosed at least one space is divided into a plurality of individual cells in a two-dimensional array;

there being a said quantum in each such cell;

framing means for supporting the panel; and fasteners securing the panel at said portions to said framing means;

a panel of glazing ranked relatively outside said cell wall means, in a confronting manner, with a space therebetween; and wall means perimetrically substantially enclosing the last-mentioned space, to provide an air chamber between the at least one cell-enveloped quantum of phase change energy storage medium and the panel of glazing; and pivot means mounting the framing means for movement of each cell through about 180 degrees between a first position wherein said outer face is presented outwardly and a second position wherein said outer face is presented inwardly.

8. The phase change energy storage panel of claim 7, wherein:
the quantum of phase change energy storage medium is a quantum of hydrated salt having a melting point in the range from about 24° C. to about 48° C.

9. The phase change energy storage panel of claim 1, wherein:
the hydrated salt is one selected from the group consisting of: $CaCl_2.6H_2O$, $Na_2CO_3.10H_2O$, $Na_2HPO_4.12H_2O$, $Na_2SO_4.10H_2O$ and $Na_2S_2O_3.5H_2O$.

10. The phase change energy storage panel of claim 7, wherein:
said cell wall means are thin relative to the thickness of said quantum of phase change energy storage medium and said quantum is on the order of 2.5 centimeters thick.

11. The phase change energy storage panel of claim 7, wherein:
said sheets are composed of flexible synthetic plastic material.

12. The phase change energy storage panel of claim 7, wherein:
said cell wall means incorporate respective filler valve means for each cell, through which each cell may receive the respective quantum of phase change energy storage medium.

13. The phase change energy storage panel of claim 7, wherein:
said cell wall means portions are free of direct communication with each said quantum, so that fasteners may be secured therethrough for supporting the panel without permitting leakage of molten phase change energy storage medium from said panel.

14. The phase change energy storage panel of claim 7, further including:
perimetrical seal means interposed between the at least one cell and said perimetrically enclosing means for establishing a generally air-tight anti-convection perimetrical seal where at least one cell confronts said glazing across said space, said perimetrical seal means being disposed to be effective regardless of whether said at least one cell is in said first position or said second position.

15. The phase change energy storage panel of claim 7, wherein:
said cell wall means is constituted by two perimetrically joined sheets of flexible material, each of which is bulged away from the other pillow-fashion to envelope said at least one quantum centrally of said portions.

16. The phase change energy storage panel of claim 7, wherein:
said cell wall means is constituted by two perimetrically joined sheets of material one of which is generally planar and the other of which is centrally bulged away from the first, individual jelly portion container body-fashion, to envelop said at least one quantum centrally of said portions.

17. The phase change energy storage panel of claim 7, wherein:
the framing means incorporates a backing of thermal insulation sheet material for the inner face of said cell wall means.

18. The phase change energy storage panel of claim 17, wherein:
said pivot means provides a generally vertical pivot axis located generally midway along the width of said cell wall means and framing means.

19. The phase change energy storage panel of claim 17, wherein:
said pivot means provides a generally vertical pivot axis located near a vertical edge at one lateral boarder of said cell wall means.

20. The phase change energy storage panel of claim 19, wherein:
a polypropylene integral hinge provides said pivot axis.

21. The phase change energy storage panel of claim 7, wherein:
said wall means are translucent.

22. A phase change energy storage panel, comprising:
at least one quantum of phase change energy storage medium capable of gaining and losing heat of fusion in a temperature within a temperature range to which the panel is to be subjected during use; said quantum being of sufficiently thin transverse cross section as to avoid permanent stratification of said quantum throughout substantially the full thickness thereof during such use;

a cell having wall means including an outer face and an inner face and enveloping each such quantum, said cell wall means including portions constructed and arranged to be engaged for supporting the panel for the panel to be impinged upon by sunlight;

said cell wall means portions extending perimetrically of said at least one quantum;

said cell wall means being constituted by two confronting sheets of liquid-tight material; said sheets being perimetrically seamed together in a liquid-tight manner to provide at least one enclosed space;

said sheets also being intermedially seamed together in a liquid-tight manner according to a pattern which is bordered by their aforesaid perimetrical seaming;
framing means for supporting the panel; and
fasteners securing the panel at said portions to said framing means;
a panel of glazing ranked relatively outside said cell wall means, in a confronting manner, with a space therebetween; and
wall means perimetrically substantially enclosing the last-mentioned space, to provide an air chamber between the at least one cell-enveloped quantum of phase change energy storage medium and the panel of glazing; and
pivot means mounting the framing means for movement of each cell through about 180 degrees between a first position wherein said outer face is presented outwardly and a second position wherein said outer face is presented inwardly.

* * * * *